United States Patent [19]

Chang et al.

[11] 4,118,548

[45] Oct. 3, 1978

[54] METHOD OF OPERATING A LIQUID-SEMICONDUCTOR JUNCTION PHOTOCELL

[75] Inventors: Kuang-Chou Chang, North Plainfield; Adam Heller, Bridgewater; Barry Miller, Murray Hill, all of N.J.

[73] Assignee: Bell Telephone Laboratories, Incorporated, Murray Hill, N.J.

[21] Appl. No.: 769,950

[22] Filed: Feb. 18, 1977

[51] Int. Cl.² ........................ H01M 6/30; H01M 6/36
[52] U.S. Cl. ................................. 429/111; 250/211 J
[58] Field of Search ...................... 429/111; 250/211 J

[56] References Cited

PUBLICATIONS

G. Hodes et al., "Photoelectrochemical Energy Conversion and Storage Using Polycrystalline Chalcogenide Electrodes", *Nature*, vol. 261, pp. 403-404, (1976).
A. B. Ellis et al., "Visible Light to Electrical Energy Conversion Stable Cds & Cdse Photoelectrodes in Agneons Electrolytes", *J.A.C.S.* vol. 98, pp. 1635-1637, (1976).

*Primary Examiner*—John H. Mack
*Assistant Examiner*—Aaron Weisstuch
*Attorney, Agent, or Firm*—George S. Indig; Richard D. Laumann

[57] ABSTRACT

Liquid-semiconductor photocells are described which produce a stable photocurrent output over extended periods of time by controllably removing material from the semiconductor surface in such a manner as to maintain the integrity of the junction characteristics. The removal may be either by photoetching or by chemical reaction with the electrolyte or with agents added to the electrolyte.

5 Claims, 3 Drawing Figures

METHOD OF OPERATING A LIQUID-SEMICONDUCTOR JUNCTION PHOTOCELL

BACKGROUND OF THE INVENTION

1. Field of the Invention

This invention relates generally to large area semiconductor liquid junction devices suitable for use as photocells and in particular to such devices suitable for use as solar cells.

2. Description of the Prior Art

A desire exists for power supplies that would be both reasonably inexpensive and efficient as well as long-lived so as to permit the construction of large area primary power supplies that might be used for applications requiring, initially, power of the order of watts or kilowatts and, ultimately, even megawatts. Recent popular literature has contained the observation that the average integrated solar energy incident on a modest sized residence in middle latitudes could, with appropriate storage facilities and theoretical attainable efficiencies for solar energy conversion, result in an energy source sufficient to operate such a residence.

It is possible to establish certain directions that studies have taken of which at least one is likely to result in commercial success. It is reasonably clear, for example, from an economic viewpoint that much of the work conducted since the introduction of the practical power cell by Chapin, Fuller and Pearson, *Journal of Applied Physics* 25 676 (1954), while certainly of value for sophisticated uses such as the small power consumption electronic devices in satellites, would likely not lead directly to a large area commercially feasible power supply.

Studies have tended to establish a direction of likely significance; namely, the use of heterojunctions which permit near lossless transmission of light through a surface material defining one side of p-n junction, and also provide for essentially total absorption in the material on the side of the junction removed from the surface.

Other considerations have led to considerable work directed toward the use of polycrystalline material rather than single crystalline material in defining the junction. While techniques have been developed that result in significant improvement in the efficiency of polycrystalline materials, with appreciable lessening of trapping and other recombination sites that reduce the efficiency of photocurrent generation, even the best solid polycrystalline structures yet produced continue to evidence interfacial trapping and significantly lesser efficiencies than single crystal structures.

An approach companion to the preceding involves definition of a junction between a polycrystalline material and a liquid. A review paper describing this approach authored by Gerischer appeared in *Electroanalytical Chemistry and Interfacial Electrochemistry* 58 263-274 (1975). It was immediately apparent that this approach offered certain advantages in obviating problems arising in the preparation of heterojunctions between solid polycrystalline surfaces. It was clear that the substitution of a liquid for one of the solid layers avoided problems attendant upon lattice mismatch which, in all but cubic materials, was further complicated by crystalline directions.

Early devices of the liquid —solid type showed promise but were deficient in two respects: (1) efficiency (at a theoretical limit of approximately 20% to 25% assuming a solar spectrum corresponding to a black body emitter) was a level of one or a few percent; and (2) devices were quite unstable with lifetimes, as measured by the time the cell produced useful photocurrents, only of the order of minutes or at most several hours.

Further work took cognizance of the fact that chemical reactions between the redox couple and the polycrystalline electrode resulted in the removal or alteration of the surface of the latter and that instability of the cell was properly ascribed to the alteration or removal of the solid semiconductor with concomitant deterioration of the liquid-semiconductor junction.

Recognition of this problem led to the development of stable redox-solid semiconductor interfaces, e.g., by anodization within the redox couple itself, to produce a solid compound semiconductor which was expectedly stable in the very environment in which it was produced and subsequently operated. Further work, including that by Heller and coworkers *Nature* 262 680 (1976), improved the efficiency of cells using such interfaces to approximately the 7% level which is considered quite adequate for many contemplated purposes.

Structures of the type described, as well as variations also designed toward stable interfaces, resulted in elimination of chemical attack for many semiconductor materials and therefore in stabilization of the photocell against the cell degradation which characterized the early work of Gerischer and others. Nevertheless, it had been observed that while the initial efficiencies for such stabilized structures are quite reasonable, many of the cells deteriorated slowly but at a rate unacceptable for many design purposes.

SUMMARY OF THE INVENTION

In accordance with the invention, deterioration in stabilized liquid solid photovoltaic cells has been determined to be caused by alteration of the solid member of the junction pair in the vicinity of the interface. Alteration, which may be due to simple contamination of the semiconductor surface in the cell resulting from the "dirty" (generally carbon electrode, epoxy sealant and a silicate wall containing) cell structures contemplated or migration of conductivity determining impurities to or from the semiconductor in significant quantities due either to electromigration within the field of the junction or to a concentration gradient due to a slow but finite preferential solubility of significant impurities in the redox couple, is counteracted by controllable removal of interfacial solid material at a rate sufficient to maintain the integrity of the designed semiconductor liquid junction characteristics. In accordance with a preferred embodiment, such surface attack, which may be so slow as to be measurable in terms of micrometers per year or even less, is accomplished by appropriate adjustment of redox couple concentration to result in photoetching. This is a most interesting concept since it is this photoetching mechanism which resulted in rapid failure of many earlier devices. Another approach may take the form of adjustment of the redox couple to include an agent or agents, e.g., buffers, to result in the desired controlled rate of removal of solid interfacial semiconductor material through simple chemical etching. Alternative approaches resulting in finite but controllable removal, the essence of the invention, as distinguished from either the rapid removal characteristic of the early and unstable interfaces or the essential nonremoval of later stabilized structures are apparent and will be discussed.

DETAILED DESCRIPTION

Figure 1:
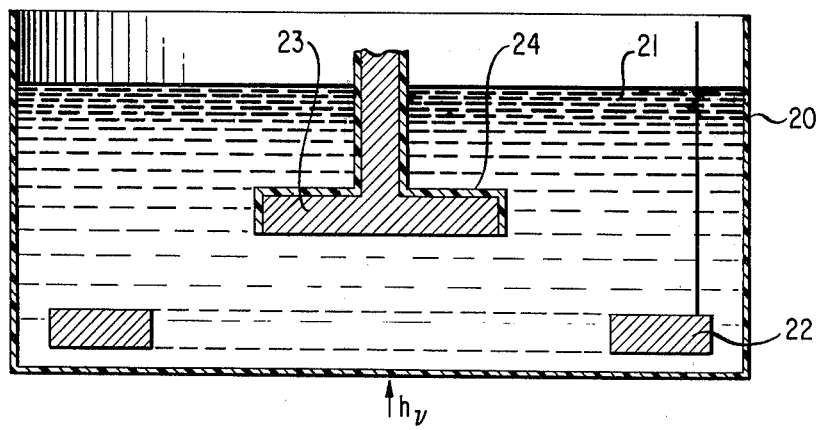
FIG. 1 is a schematic representation of a liquid-semiconductor photocell.

The cell structure of FIG. 1 comprises a container 20, electrolyte 21, counter electrode 22, which in our devices is a carbon electrode although other inert materials may be used, and the active electrode 23. The electrolyte is typically an aqueous electrolyte although organic electrolytes such as ethers or propylene carbonate might be used. Electrode 23 is insulated as with epoxy 24 except where illuminated and activated. The bottom of the cell, opposing electrode 23, is transparent to pass incident light as shown.

Continued high efficiency of liquid junction solar cells depends upon the maintenance of the semiconductor surface characteristics for extended time periods.

This involves maintaining both the stability of the semiconductor material and the retention of cell activity. Stability may be increased by choice of a reducing electrolyte, possibly with additives, that does not cause either rapid chemical or photoetching of the semiconductor. Cell activity may be reduced by any of several mechanisms. The semiconductor material may react with the electrolyte to form a passivating layer, e.g., $2h^+ + CdS \rightarrow Cd^{2+} + S^0$ and the sulfur forms a layer which causes the cell to become inoperative. Of perhaps more importance for cell operation over longer time periods are the possibilities that the semiconductor surface may be altered by adsorption of impurities from the liquid, exchange of ions between the lattice and the liquid, and the loss or gain of dopant from the semiconductor because of preferential dopant solubility. If the semiconductor surface is caused to recede, either by chemical or photoetching, rapidly enough to overcome the mentioned degrading effects, the desired semiconductor surface characteristics can be maintained. The principles involved in the maintenance of the integrity of the semiconductor surface and semiconductor-liquid or p-n junction characteristics will be illustrated by reference to a cell using a GaAs electrode.

Figure 2:
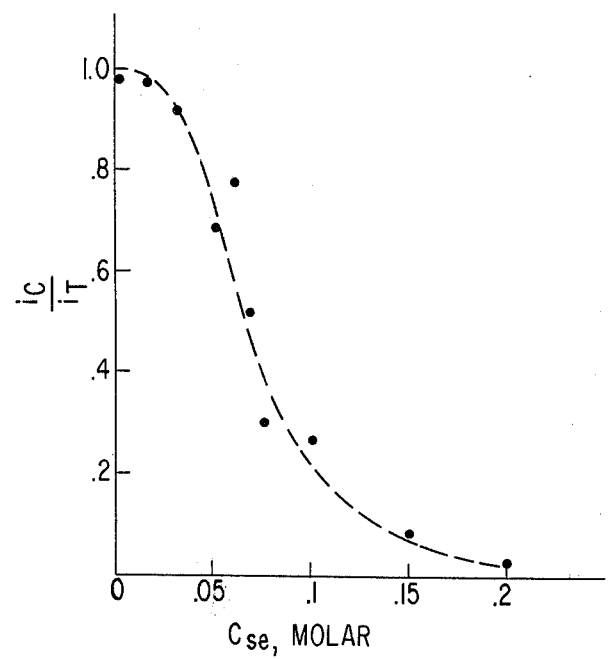
FIG. 2 is a plot of the ratio of the corrosion current to the total current as a function of total selenide concentration for a photocell with a GaAs electrode.

An n type single crystal GaAs electrode was used with a Se$^-$/Se$_2^-$ redox couple. The lower limit of the redox couple concentration is about 0.1 molar and is determined by the requirement that the cell carry a useful photocurrent and not photoetch at an excessive rate. The doping concentration is typically $2 \times 10^{17}/cm^3$ although any value up to $5 \times 10^{18}/cm^3$ can be used. At the upper limit, the space charge layer becomes too thin to permit all light to be absorbed within the space charge layer. The selenium is conveniently put into solution by passing H$_2$Se into a basic solution, such as KOH, and allowing air to oxidize some Se$^-$ to Se$_2^-$ or by dissolving elemental Se in the Se$^-$ solution. Other bases may be used as well as nonaqueous electrolytes. For all concentrations discussed, the Se$^-$/Se$_2^-$ ratio was approximately 8. Illumination was provided by a quartz-halogen lamp operating at a level sufficient to provide short circuit cell current of 50 ma/cm$^2$ which corresponds to the current obtained at three AM2 runs. AM2 (air mass two) is equivalent to the illumination of noon time sun in middle latitudes in the winter. The ratio of the corrosion, i.e., photoetching, current to the total current, which represents the fraction of the photocurrent not going to the desired regenerative solar cell path and therefore causing photoetching, as determined by electrode weight loss is shown in FIG. 1 as a function of selemium concentration. The same technique may be used to determine $i_C/i_T$ for other materials. The dissolution stoichiometry for photoetching was six electrons per GaAs molecule as confirmed by the etch rate in the absence of selenide. This factor was used to convert the measured weight loss of the electrode to corrosion current. The dotted curve represents a fit to the expression $$i_C/i_T = (1 + 3500C_{Se}^3)^{-1}$$

where $C_{se}$ is the total molar concentration of selenium in the solution. As can be seen, the corrosion current decreases monotonically as the selenium concentration increases although it never reaches zero and is therefore always present. The upper limit to selenium concentration for practical operating cells, not shown in FIG. 2, is determined by the amount of selenide that can be dissolved in the solution.

Figure 3:
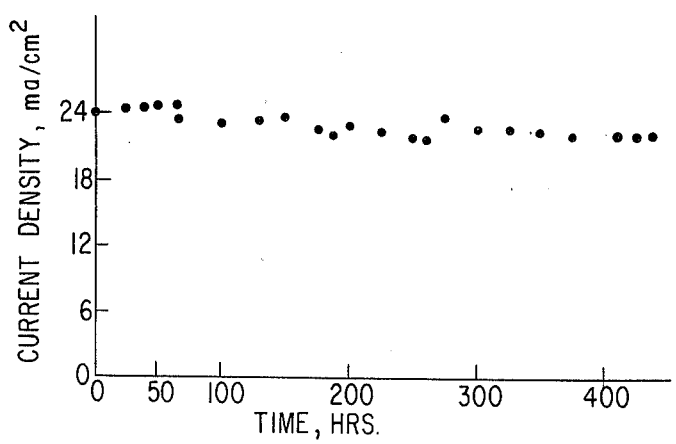
FIG. 3 is a plot of current output from a GaAs photocell made in accordance with this invention as a function of time.

FIG. 3 is a plot of the photocurrent vs time from a GaAs cell run continuously for 18 days near the maximum power point, that is with a 50 ohm load. The total selenium concentration was nominally 1 molar. The lamp was run with an output between two and three AM2 suns. A current density of 22 ma/cm$^2$ and a voltage of approximately 0.38V were maintained essentially constant throughout the 18 day run. The photocurrent is essentially constant throughout the time period and the change is too small to make any estimate of the useful cell lifetime which may be estimated by other means as it is limited ultimately by electrode failure caused by its essentially complete dissolution. The measured value of $i_C/i_T$ as determined by weight loss was approximately 0.001 with an average corrosion penetration less than 12 microns. At this rate, it would take about 10$^5$ hours, at one AM2 sun, to dissolve 1 mm of the semiconductor material. A conservative estimate of cell use would be $3 \times 10^3$ hours per year which means that a cell with an electrode 100 microns thick would not fail through photoetching for a period of 3 to 4 years. The photoetching rate may be further decreased, thus increasing cell life, by increasing the selenium concentration. The etch rate should exceed 300 Angstroms per day or 10 microns per year to maintain cell stability. Redox concentrations that will maintain this etch rate are easily determined as the ratio of corrosion to photocurrent is known and the photocurrent density is easily estimated.

Although the semiconductor surface photoetched at a rate tolerable for extended life, the photoetching proceeded sufficiently rapidly to prevent any degradation of the surface design characteristics by preventing adsorption of impurities, etc.

In addition to the described GaAs cell, the described principles will yield a steady photocurrent output in cells using cadmium chalcogenide electrodes and a chalcogen redox couple. For example, stable output, although with slow removal of material from the semiconductor surface, can be obtained with a CdTe electrode in a selenide/polyselenide redox electrolyte.

In addition to the class of photochemical reactions just described, which maintain the integrity of the semiconductor by slowly removing material by photoetching, chemical reactions between material on the semiconductor surface and in the electrolyte may be used to maintain the integrity of the surface. As two illustrative examples, a CdSe electrode in a sulfide/polysulfide redox couple may maintain its surface integrity while being chemically etched through the reactions $2h^+ + CdSe \rightarrow Cd^{2+} + Se^{\circ}$ followed by $S + Se \rightarrow (SSe)$ and a CdS electrode in a selenide/polyselenide redox couple may maintain its surface while being chemically etched through the reactions $2h^+ + CdS \rightarrow Cd^{2+} + S^{\circ}$ followed by $Se + S \rightarrow (SSe)^-$. Other cadmium chalcogenide semiconductors in chalcogenide electrolytes follow similar principles.

For example, the stability of the output of a CdTe cell with an approximately 1 molar selenium redox electrolyte concentration was tested by maintaining the semiconductor electrode at approximately $-1.0V$ vs. standard calomel electrode. At this potential the CdTe photoetched at a rate of 2.5mg/cm² hour while the photocurrent density was 24 mA/cm². The photoetching electrode delivers a stable current as shown in the following table.

| Elapsed Time (h) | Photocurrent (mA) |
|---|---|
| 0 | 4.72 |
| 24 | 4.75 |
| 48 | 4.76 |
| 110 | 4.96 |

The $i_c/i_T$ ratio was 0.023 and sufficed to maintain cell stability as evidenced by the values in the table.

What is claimed is:

1. A method of operating a photocell containing a photovoltaic junction between the surface of a semiconductor material and a liquid electrolyte containing a redox couple characterized in that said method comprises:
controllably removing said surface of said semiconductor material at a rate of at least 300 Angstroms per day yet maintaining the characteristics of said junction.

2. A method as recited in claim 1 in which said removing step is through photoetching.

3. A method as recited in claim 2 in which said semiconductor material consists essentially of n-type GaAs.

4. A method as recited in claim 3 in which said redox couple is selected from the group consisting of selenide and telluride anions and mixtures thereof.

5. A method as recited in claim 4 in which said redox couple has a concentration greater than 0.1 molar.

* * * * *